(12) United States Patent
ElBizri

(10) Patent No.: US 8,229,807 B2
(45) Date of Patent: Jul. 24, 2012

(54) SYSTEM AND METHOD OF OFFSETTING INVOICE OBLIGATIONS

(76) Inventor: Samer ElBizri, Los Angeles, CA (US)

( * ) Notice: Subject to any disclaimer, the term of this patent is extended or adjusted under 35 U.S.C. 154(b) by 463 days.

(21) Appl. No.: 12/188,875

(22) Filed: Aug. 8, 2008

(65) Prior Publication Data

US 2009/0043678 A1 Feb. 12, 2009

Related U.S. Application Data

(60) Provisional application No. 60/955,364, filed on Aug. 12, 2007.

(51) Int. Cl.
*G07B 17/00* (2006.01)
*G06Q 40/00* (2012.01)
(52) U.S. Cl. .............. 705/30; 705/35; 705/39; 705/40
(58) Field of Classification Search .............. 705/30, 705/35, 39, 40
See application file for complete search history.

(56) References Cited

U.S. PATENT DOCUMENTS

| | | | |
|---|---|---|---|
| 4,870,260 | A | 9/1989 | Niepolomski et al. |
| 5,179,584 | A | 1/1993 | Tsumura |
| 5,220,501 | A | 6/1993 | Lawlor et al. |
| 5,283,829 | A | 2/1994 | Anderson |
| 5,326,959 | A | 7/1994 | Perazza |
| 5,383,113 | A | 1/1995 | Kight et al. |

(Continued)

FOREIGN PATENT DOCUMENTS

| | | |
|---|---|---|
| WO | 99/07102 A1 | 2/1999 |
| WO | 99/13422 A1 | 3/1999 |
| WO | 99/24921 A1 | 5/1999 |

(Continued)

OTHER PUBLICATIONS

Mark Story. (Mar. 2005). FACTORING; When Money Flows—Smoothing the business cycle makes sense; As memories of prompt payment fade into the past, organisations are tapping into factoring to safeguard cash flow. New Zealand Management,57. Retrieved May 7, 2012, from ABI/INFORM Global. (Document ID: 802084911).*

*Primary Examiner* — Scott Zare
(74) *Attorney, Agent, or Firm* — Sandra P. Thompson; Buchatter Nemer

(57) ABSTRACT

Methods for resolving invoice obligations are disclosed that include: a) providing at least one sales invoice, wherein each sales invoice comprises a credit value, b) providing at least one purchase invoice, wherein each purchase invoice comprises a debit value, and c) offsetting at least part of the debit value of a purchase invoice with at least part of the credit value of a sales invoice. Methods are also disclosed for resolving invoice obligations that include: a) providing at least one seller having at least one sales invoice, b) providing at least one customer having at least one sales invoice and at least one purchase invoice, wherein at least one of the at least one sales invoice and at least one of the at least one purchase invoice forms an invoice chain; and c) offsetting the at least one sales invoice of the seller with at least one sales invoice of the customer, at least one purchase invoice or a combination thereof. Systems and software for resolving invoice obligations are disclosed that include: a) an executable code for intelligently determining an invoice chain comprising at least one purchase invoice having a debit value and at least one sales invoice having a credit value and offsetting the debit value with the credit value, b) a medium for executing the executable code, c) a display device, and d) an interaction tool for executing the executable code.

2 Claims, 3 Drawing Sheets

U.S. PATENT DOCUMENTS

| | | | |
|---|---|---|---|
| 5,465,206 A | 11/1995 | Hilt et al. | |
| 5,483,445 A | 1/1996 | Pickering | |
| 5,504,677 A | 4/1996 | Pollin | |
| 5,544,086 A | 8/1996 | Davis et al. | |
| 5,557,518 A | 9/1996 | Rosen | |
| 5,572,004 A | 11/1996 | Raimann | |
| 5,652,786 A | 7/1997 | Rogers | |
| 5,671,285 A | 9/1997 | Newman | |
| 5,699,528 A | 12/1997 | Hogan | |
| 5,930,778 A | 7/1999 | Geer | |
| 6,044,362 A | 3/2000 | Neely | |
| 6,058,380 A | 5/2000 | Anderson et al. | |
| 6,081,790 A | 6/2000 | Rosen | |
| 6,141,651 A | 10/2000 | Riley et al. | |
| 6,330,543 B1 | 12/2001 | Kepecs | |
| 6,360,211 B1 | 3/2002 | Anderson et al. | |
| 6,493,685 B1 | 12/2002 | Ensel et al. | |
| 6,507,826 B1 | 1/2003 | Maners | |
| 6,532,450 B1 | 3/2003 | Brown et al. | |
| 6,625,657 B1 | 9/2003 | Bullard | |
| 6,745,229 B1 | 6/2004 | Gobin et al. | |
| 6,751,663 B1 | 6/2004 | Farrell et al. | |
| 6,807,533 B1 | 10/2004 | Land et al. | |
| 6,826,536 B1 | 11/2004 | Forman | |
| 6,826,542 B1 | 11/2004 | Virgin et al. | |
| 6,832,208 B1 | 12/2004 | Berry et al. | |
| 6,847,942 B1 | 1/2005 | Land et al. | |
| 6,856,974 B1 | 2/2005 | Ganesan et al. | |
| 6,882,983 B2 | 4/2005 | Furphy et al. | |
| 6,883,004 B2 | 4/2005 | Bahl et al. | |
| 6,910,021 B2 | 6/2005 | Brown et al. | |
| 6,937,995 B1 | 8/2005 | Kepecs | |
| 6,963,885 B2 | 11/2005 | Calkins et al. | |
| 6,968,571 B2 | 11/2005 | Devine et al. | |
| 6,980,930 B2 | 12/2005 | Nakamitsu et al. | |
| 6,990,224 B2 | 1/2006 | Warren et al. | |
| 7,003,494 B2 | 2/2006 | Beach et al. | |
| 7,006,994 B1 | 2/2006 | Campbell et al. | |
| 7,058,600 B1 | 6/2006 | Combar et al. | |
| 7,058,612 B2 | 6/2006 | Park et al. | |
| 7,085,811 B2 | 8/2006 | Sansone et al. | |
| 7,089,213 B2 | 8/2006 | Park et al. | |
| 7,099,845 B2 | 8/2006 | Higgins et al. | |
| 7,103,577 B2 | 9/2006 | Blair et al. | |
| 7,107,244 B2 | 9/2006 | Kight et al. | |
| 7,107,249 B2 | 9/2006 | Dively et al. | |
| 7,130,818 B2 | 10/2006 | Fisher et al. | |
| 7,133,844 B2 | 11/2006 | Park et al. | |
| 7,158,955 B2 | 1/2007 | Diveley et al. | |
| 7,165,052 B2 | 1/2007 | Diveley et al. | |
| 7,167,860 B1 | 1/2007 | Black et al. | |
| 7,178,721 B2 | 2/2007 | Maloney | |
| 7,181,430 B1 | 2/2007 | Buchanan et al. | |
| 7,184,989 B2 | 2/2007 | Hansen et al. | |
| 7,191,149 B1 | 3/2007 | Lanham et al. | |
| 7,206,768 B1 | 4/2007 | deGroeve et al. | |
| 7,213,003 B1 | 5/2007 | Kight et al. | |
| 7,216,106 B1 | 5/2007 | Buchanan et al. | |
| 7,219,832 B2 | 5/2007 | Fillinger et al. | |
| 7,225,143 B1 | 5/2007 | Kepecs | |
| 7,225,249 B1 | 5/2007 | Barry et al. | |
| 7,236,950 B2 | 6/2007 | Savage et al. | |
| 7,240,031 B1 | 7/2007 | Kight et al. | |
| 7,243,143 B1 | 7/2007 | Bullard | |
| 7,246,741 B2 | 7/2007 | Cable et al. | |
| 7,249,074 B1 | 7/2007 | Land et al. | |
| 7,269,575 B1 | 9/2007 | Concannon et al. | |
| 7,302,411 B2 | 11/2007 | Ganesan et al. | |
| 7,340,433 B1 | 3/2008 | Kay et al. | |
| 7,849,004 B2 | 12/2010 | Choudhuri et al. | |
| 2002/0082985 A1 | 6/2002 | MacKay | |
| 2002/0120570 A1 | 8/2002 | Loy | |
| 2002/0184147 A1 | 12/2002 | Boulger | |
| 2003/0158791 A1 | 8/2003 | Gilberto et al. | |
| 2003/0220863 A1 | 11/2003 | Holm et al. | |
| 2004/0167836 A1 | 8/2004 | Muller et al. | |
| 2005/0177507 A1* | 8/2005 | Bandych et al. | 705/40 |
| 2007/0244779 A1* | 10/2007 | Wolff | 705/35 |

FOREIGN PATENT DOCUMENTS

| | | |
|---|---|---|
| WO | 99/27479 A1 | 6/1999 |
| WO | 99/33010 A1 | 7/1999 |
| WO | 00/33220 A1 | 6/2000 |
| WO | 00/33227 A1 | 6/2000 |
| WO | 00/48053 A2 | 8/2000 |
| WO | 00/48113 A1 | 8/2000 |
| WO | 00/58876 A1 | 10/2000 |
| WO | 00/72245 A1 | 11/2000 |
| WO | 01/09782 A1 | 2/2001 |
| WO | 01/39062 A1 | 5/2001 |
| WO | 01/39073 A1 | 5/2001 |
| WO | 01/40895 A1 | 6/2001 |
| WO | 01/41020 A1 | 6/2001 |
| WO | 01/77938 A1 | 10/2001 |
| WO | 01/80102 A1 | 10/2001 |
| WO | 02/11089 A1 | 2/2002 |
| WO | 02/14973 A2 | 2/2002 |
| WO | 02/23443 A1 | 3/2002 |
| WO | 03/042877 A1 | 5/2003 |
| WO | 03/048899 A1 | 6/2003 |
| WO | 03/069441 A1 | 8/2003 |
| WO | 2004/111899 A1 | 12/2004 |
| WO | 2005/013076 A1 | 2/2005 |
| WO | 2005/017704 A1 | 2/2005 |
| WO | 2005/038557 A1 | 4/2005 |
| WO | 2005/040973 A1 | 5/2005 |
| WO | 2005/059843 A1 | 6/2005 |
| WO | 2005/091747 A1 | 10/2005 |
| WO | 2005/106726 A1 | 11/2005 |
| WO | 20051106726 A1 | 11/2005 |
| WO | 2005/124639 A1 | 12/2005 |
| WO | 2006/026418 A1 | 3/2006 |
| WO | 2006/026576 A1 | 3/2006 |
| WO | 2006/049994 A1 | 5/2006 |
| WO | 2006/071882 A1 | 7/2006 |
| WO | 2006/079878 A1 | 8/2006 |
| WO | 2006/083755 A1 | 8/2006 |
| WO | 2006/084501 A1 | 8/2006 |
| WO | 2006/092004 A1 | 9/2006 |
| WO | 2006/128912 A1 | 12/2006 |
| WO | 2007/121521 A1 | 11/2007 |
| WO | 2008/011102 A1 | 1/2008 |
| WO | 2008/042820 A1 | 4/2008 |
| WO | 2008/042823 A1 | 4/2008 |
| WO | 2008/045783 A1 | 4/2008 |

* cited by examiner

SYSTEM AND METHOD OF OFFSETTING INVOICE OBLIGATIONS

This application is a United States Utility Application that claims priority to U.S. Provisional Application Ser. No. 60/955,7364 filed on Aug. 12, 2007, which is incorporated herein in its entirety by reference.

FIELD OF THE SUBJECT MATTER

The field of the subject matter is the offsetting of invoice obligations and the systems and methods utilized to complete those offsetting transactions.

BACKGROUND

Business, commercial and non-profit entities or individuals issue invoices to customers for products or services sold. These invoices include an amount owed for such products and services, and most may include the quantities of those products and services and the stated or agreed upon prices or fares among other terms. Government entities also issue invoices for services, asset sales, tariffs, interest, taxes and penalties to individual and business taxpayers. Product and services may also include interest, loan principal and penalties. These business, commercial and government entities and/or individuals that issue invoices are herein collectively referred to as "sellers".

Sellers routinely have a large amount of their assets in account receivables or unpaid invoices that these sellers have issued to customers for payment but have not been paid yet. Although the current batch of invoices may be paid within a reasonable amount of time—say 30-90 days—by the time these invoices are paid, new invoices would have been issued. This process and the times it takes customers to pay leave sellers with a reduced level of capital and free assets to conduct business.

In order to increase the level of available cash for business purposes (including mainly paying obligations to others), sellers will routinely discount their receivables (sales invoices), borrow money or utilize other financial methods, such as factoring, issuing short term notes or receivable financing. While these processes are available to businesses, related discounts, interest and transaction costs can significantly affect the cost of doing business, growth and profit margins for a business. Although these processes are not desired by businesses that are always interested in decreasing extraneous costs and penalties, currently there are no effective alternatives.

Many sellers discount their receivables in order to entice customers to pay early. Although this strategy is effective some of the time, it is quite costly to sellers (average of 2% per invoice). Some sellers can be qualified to finance their sales invoices at interest rates that correspond to creditworthiness and ranging on average from 1% below to 11% above prime rate. Some sellers factor (sell) their sales invoices at an average cost of 1% to 4% of the sales invoice credit value depending on terms and receive about 70% to 90% of the credit value until the customer pays.

Some sellers incorporate the cost of interest, transaction costs and penalties in their invoices and pass it on to their customers, which increase the liability and costs to these customers and reduce the seller's price competitiveness. Some sellers write these additional costs off without passing them along to customers, in order to maintain good working relationships at the cost of lower profit margins. As used herein, the term "customer" means any person or entity that receives an invoice for payment. As used herein, the term "payment" means any exchange of money to clear an amount of an invoice debit value and obligations. This process is shown in Prior Art FIG. 1, which shows conventional methods of invoice payment and financing.

In Prior Art FIG. 1, a process 100 is shown between a seller 110 and a customer 120. The seller 110 sells goods or services 130 and the customer 120 makes payments within 30 to 90 days 140. After 30 to 90 days, the cycle 150 repeats between the seller 110 and its customers 120. An average of 8% to 15% of a seller's 110 annual revenues is locked in unpaid sales invoices 160. In order to get cash, the seller 110 can discount the sales invoice 170 to entice the customer 120 to pay early; sell invoices to a factoring firm, or borrow money from a bank or by issuing debt instruments in the capital markets.

As a reference point for the subject matter disclosed herein, the factoring market in the United States exceeded $127 billion in outstanding factored receivables (sales invoices) in 2006. The asset-based lending market exceeds $480 billion and around $2 trillion in outstanding commercial papers in the United States. These numbers are growing, coupled with recent financial downturn in various sectors, means that additional invoices are left unpaid, financing options are increasingly limited and so is availability of factoring capital.

U.S. Pat. No. 6,910,021 issued to Brown et al. in 2005 describes a financial management system that supports offsetting programs, but does not actually complete the offsetting process. The United States Treasury has set up a trial offsetting system whereby refunds that are owed to a taxpayer are offset by any past due judgments or family/child support payments owed by that same taxpayer. There do not appear to be any current procedures methods or systems though for matching up sellers and customers to offset their invoice obligations without making a payment drawn from a bank, credit or investment account (with extremely limited and inefficient exceptions of bartering or payment forgiveness). There also do not appear to be any current procedures, methods or systems for resolving invoice obligations of multiple sellers multiple customers and multiple invoices at the same time or in an intelligent manner to quickly offset invoices for as many related parties as possible.

Based on the current process of issuing and paying invoices whether on paper or electronically, between sellers and customers, it would be economically helpful and desirable to produce a new system and related methods for matching a seller's invoices and offsetting its purchase invoices with its sales invoices by linking its invoices with those of its customers and its sellers (vendors) and their customers and sellers in order to offset invoice debit and credit values, to reduce payment times, to reduce the number of outstanding invoices, to reduce invoice discount costs, penalties, interest, and the need to borrow or finance assets, to increase buying power or a combination thereof.

BRIEF DESCRIPTION OF THE FIGURES

Prior Art

SUMMARY

Figure 1:
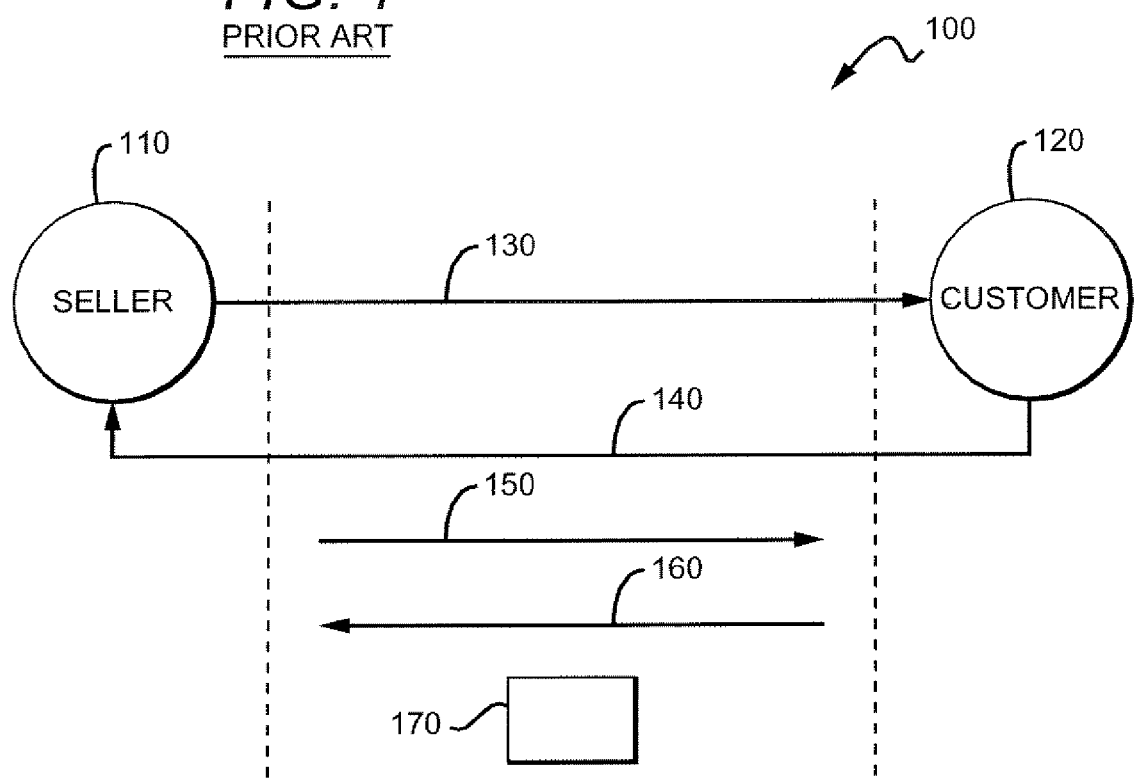
FIG. 1 shows an invoice diagram that shows conventional methods of invoice payment and financing.

Methods for resolving invoice obligations are disclosed that include: a) providing at least one sales invoice, wherein each sales invoice comprises a credit value, b) providing at least one purchase invoice, wherein each purchase invoice comprises a debit value, and c) offsetting at least part of the debit value of a purchase invoice with at least part of the credit value of a sales invoice.

Methods are also disclosed for resolving invoice obligations that include: a) providing at least one seller having at least one sales invoice, b) providing at least one customer having at least one sales invoice and at least one purchase invoice, wherein at least one of the at least one sales invoice and at least one of the at least one purchase invoice forms an invoice chain; and c) offsetting the at least one sales invoice of the seller with at least one sales invoice of the customer, at least one purchase invoice or a combination thereof.

Systems for resolving invoice obligations are disclosed that include: a) an executable code for intelligently determining an invoice chain comprising at least one purchase invoice having a debit value and at least one sales invoice having a credit value and offsetting the debit value with the credit value, b) a medium for executing the executable code, c) a display device, and d) an interaction tool for executing the executable code.

Additionally, software packages are described that include an executable code for intelligently determining an invoice chain comprising at least one purchase invoice having a debit value and at least one sales invoice having a credit value and offsetting the debit value with the credit value.

DETAILED DESCRIPTION

Surprisingly, a new system and related methods have been produced to enable a seller to use its sales invoices' value instead of cash or financing, to pay or fulfill its obligation in its purchase invoices' value and settle many or all invoices, in order to reduce invoice discount costs, penalties, interest, the need to borrow or finance assets, to reduce payment times, to reduce the number of outstanding invoices, to increase buying power or a combination thereof. The novel systems and methods described herein also provide a faster cheaper and more efficient alternative to factoring, any form of borrowing, bartering or financing of invoices. An invoice may be of any form, electronic or paper based; a bill; a payment owed; a credit or debit commitment of any kind; or any form of agreement or payment obligation between seller and customer. Every sales invoice has a corresponding purchase invoice, where a sales invoice and it's corresponding purchase invoice have the same amount, issuer, terms, dates due, dates issued, payer and payee.

Contemplated methods for resolving invoice obligations include: providing at least one seller having at least one sales invoice and at least one customer having at least one sales invoice and one purchase invoice, wherein the at least one seller and the at least one customer forms an invoice chain; and offsetting amount value of the at least one sales invoice of the seller with amount value of the at least one sales invoice of the customer. An invoice chain may contain a large number of sellers and customers, invoices, amounts, currencies, varying invoice due dates and issuance dates. An invoice may be part of one or more invoice chains. An invoice amount may be cleared by one or more invoice chains at the same or separate times. An invoice amount may be partially or fully cleared through offsetting. The concept of resolving invoice obligations means fulfillment of an invoice obligation, payment or offsetting of invoice. As used herein, the term "offsetting" means the transfer of a credit value of one sales invoice to satisfy the debit value of a purchase invoice without the need to make a cash, check or electronic funds transfer, barter, factor, borrow or any combination thereof. As used herein, credit value means an amount to be received on an invoice and debit value means an amount to paid on an invoice.

Specifically, electronic and/or automated fulfillment and settlement of obligations on invoices is achieved by matching and offsetting credit value amounts in sales invoices with debit value amounts in purchase invoices of a customer, through linking together sellers' invoices with customers' invoices. For example, a seller (seller A) issues an invoice (sales invoice) to a customer, that customer in turn is also a seller (seller B) who issues an invoice to its customer, who is also a seller (seller C) and so on, forming an implied tree and branches of linked sellers, customers and invoices, referred to here as an invoice chain or chain. In instances where the first seller in a chain is also a customer to another seller in the same invoice chain ("complete chain"), amounts in the linked invoices can be offset against each other (wherein the debit value of a customer's linked purchase invoice is offset by the credit value of its sales invoice(s) in the same chain), which is shown and described in detail later in FIG. 2.

All sellers are also customers in a complete chain. A "disparity chain" is an incomplete chain where the first or initial seller is not a customer in the same invoice chain and/or the last customer in the chain is not a seller in the same chain. Sellers who are also customers to other sellers in the same disparity chain can have their invoices offset and cleared in the same fashion as a complete chain, whereas an amount of the debit value purchase invoice of the last customer in the chain can be offset by an amount of the credit value of one or more of its sales invoices outside this chain; or be paid through either traditional sources or automatic factoring of one or more of its sales invoices, while the first seller will be able to offset one or more of its purchase invoices in other chains or receive the credit value from the last customer in the chain. As used herein traditional sources means cash, check or electronic funds transfer, barter, factor, borrow or any combination thereof.

Therefore, at least one sales invoice of a seller is matched with a purchase invoice of a customer and offset with at least one sales invoice of that customer. The sellers and customers may be in the system at the same time or may be matched as one or more sellers and/or customers enter the system. For example, a seller's invoice "sales invoice" may be held in the system for a period of time until a suitable invoice chain is formed by the system until it can be offset. In another example, sales invoices and purchase invoices from different sellers and customers may enter the system and be matched at the same time to form one or more offsetting invoice chains. The system automatically determines and picks the optimal or close to optimal starting points of first seller and/or first invoice in forming invoice chains. The system also automatically determines and forms the optimal or close to optimal invoice chain for offsetting. In determining the optimal or close to optimal starting point or invoice chain, the system bases its determination on its determined optimal conditions. The system can also operate without optimization by picking first seller and/or first invoice and invoice chains randomly or first come first served or some other business decisions.

As used herein, the phrase "determined optimal conditions" means the best conditions to determine the optimal or close to optimal starting point of invoice chains and invoice chains to offset. This optimization process takes into consideration fixed and variable conditions of: a) priorities as determined by economic conditions and seller's satisfaction that the system can adjust or be adjusted to handle, for example, maximizing liquidity, fastest offsetting and clearing time vs. offsetting and clearing the highest amount per invoice (where the default is the highest amount per invoice within a day); b) special conditions such as invoice terms, limited time discounts offered by sellers, seller limited choices of which purchase invoices they would like to offset first, bankruptcy laws, regulations, currency conversions and other factors; and c) computer limitations.

The systems and methods described herein are used to: a) obtain invoices (sales invoices and/or purchase invoices) or invoice information and authorization from sellers and customers (ideally obtaining all sales invoices from sellers and all purchase invoices from customers), b) match sales invoices with their corresponding purchase invoices; sellers and customers and build credit value and debit value chains of related invoices as invoice chains for offsetting and clearing, c) offset purchase invoice debits with sales invoice credits, report and manage post-processing matters.

On contemplated method determines if a seller (seller A) has issued a sales invoice to a customer, who is in turn also a seller (seller B), who has issued a sales invoice to a customer, who is in turn also a seller (seller C), and this process is continued until reaching a sales invoice that is issued to seller A. Once this second phase is complete, a chain of sales invoices is formed that starts with seller A (as a seller) and ends with the same seller A (as a customer). These invoices are then automatically offset or the results are the presented to all of the sellers and customers in the chain where they can agree to offset their outstanding sales invoices with their outstanding purchase invoices in the chain. Sellers in the chain of invoices can either accept or reject offsetting the presented invoices manually or automatically through a set of computerized rules and programs designed to take advantage of and use contemporary technologies and formats.

Figure 3:
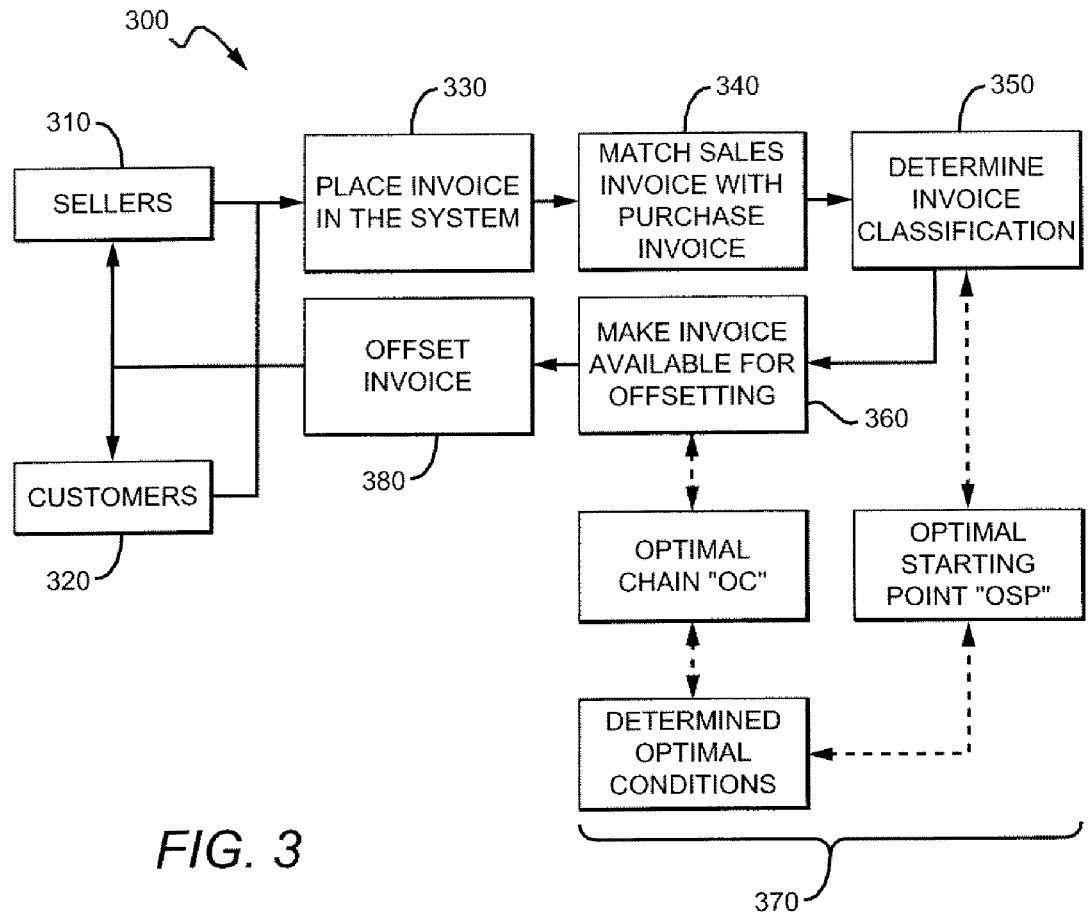
In FIG. 3, a contemplated system, which may be referred to as the Invoice Clearing Systems looks for specific relationships and matching characteristics between sales invoices issued by different sellers and uses these relationships to offset invoice obligations and clear them.

In a contemplated system as shown in FIG. 3, the system 300, which may be referred to as Invoice Clearing System, is a computerized system that processes and offsets invoices as described herein. In this instance, sellers 310 and customers 320 put invoices into the system 330. The system requires that every sales invoice be matched 340 with its corresponding purchase invoice in the system in order to be included in the offsetting process. Some exceptions for insured or high credit quality sellers or customers may have their invoices included without matching. The optimal starting point and determined optimal conditions are determined in order to evaluate whether the invoice qualifies as a starting point to building an invoice chain. After classifying the invoice 350, it can then be made available to be included 360 in an invoice chain by the system 300. The system 300 will include the invoice in one or more chains until it becomes part of an optimal invoice chain 370. As used herein, the phrase "optimal invoice chain" means a chain that is determined to have the best economic value based on the determined optimal conditions. Once the invoice is part of an optimal invoice chain 370, it is offset with other invoices in the chain 380 and settled. The settlement will be reported to the seller and/or customer electronically and through other means as desired.

As shown, contemplated embodiments account for, among other things, different terms and due dates, currency denominations and/or legal rights related to the invoices in the invoice chain. Contemplated users may also conduct business within contemplated systems anonymously (through an anonymous identifier) or may be identified specifically. Contemplated systems may extended to adapt to complex and/or modified compliance systems, to servicing lenders of sales invoices, factoring service providers, network providers, accounting systems, other computer applications and combinations thereof.

Some contemplated systems and methods described herein are used to:
1) Obtain invoices from sellers and customers by:
   Method for sellers and customer to communicate with the network.
   Invoices and invoice obligation information will be inputted in the system.
   Preferably, obtain all sales and purchase invoices from sellers, and all purchase invoices from customers who are not sellers.
2) Match sales invoices with their corresponding purchase invoices; sellers and customers, build credit, and debit chains of related invoices as invoice chains for offsetting and clearing. The system:
   Automatically determines and picks the optimal or close to optimal starting point ("Optimal Starting Point") to build an invoice chain or invoice chains. An Optimal Starting Point depends on the conditions or results defined and determined in the system's "Determined Optimal Conditions". The system can also pick starting points of first invoice and seller in chains randomly or first come first served.
   Build chains based on the Determined Optimal Conditions.
3) Offset purchase invoice debits with sales invoice credits incorporating interest discounts or debits as determined by interest parity by:
   Clearing and settling these invoices. May clear multiple chains simultaneously and amounts of an invoice balance may be cleared by more than one chain.
   Providing settlement confirmations and data to sellers and customers or their systems directly.

Specifically, FIG. 3, shows a block diagram for a contemplated system, where a contemplated workflow of invoices in a computer-based network environment and/or internet connection are described. In this diagram, a user (not shown) introduces an invoice into a contemplated system, where this introduction step may include a number of steps, such as initial registration, authorization, uploading information and/or inputting invoice information/data into the system manually or automatically through computer programs and networks, as described herein. Once the invoice is introduced into the system, the system will start the matching process as shown in 1 through 3 above.

If a chain match is found (meaning, an invoice is included in one or more formed invoice chains), the system determines the match amounts, any interest, terms and other aspects for clearance and in some cases presents them to the user for approval or automatically approves offsetting them. The system will also account for post processing issues, such as accounting methods, reporting and reprocessing the invoice's remaining balance in the system. The matched and offset amounts in the invoices are then fulfilled, settled and closed by the system. If no match is found, the invoice is maintained in the system's database or placed back into the system and reprocessed until a match in an invoice chain is found.

If the invoice is included in a disparity chain and the user's entity is the last customer in the chain, then the user may use another sales invoice outside the chain to offset the purchase invoice in the chain or the system may offer the user a premium from one or more of the sellers in the chain as an incentive for early payment or provide the user with a financing option, such as a no interest loan for the remaining term (until due date) of its outstanding purchase invoice. This process is automated with the user being able to set its financing options, terms and rates to automatically accepted levels or manually accept or reject them on a transactional basis.

If the invoice is found to be part of an incomplete invoice chain or disparity chain and the user's entity is the first seller in the chain then the system may allow the user to pay one or more of the user's outstanding purchase invoices; or amounts from the payment collected from the last customer in the chain; or factoring for the sales invoice in the chain; or a combination thereof. The factoring process is automated with the user being able to set its options, terms and rates to automatically accepted levels or manually accept or reject them on a transactional basis.

Contemplated systems for resolving invoice obligations include: an executable code for intelligently determining an invoice chain comprising at least one sales invoice having a credit value and at least one purchase invoice having a debit value and offsetting an amount of the credit value of at least one sales invoice with an amount of the debit value of at least one purchase invoice, a medium for executing the executable code, a display device, and an interaction tool for executing the executable code.

Contemplated system software can run on a computer and be connected to the internet as well as to one or more internal networks. In one embodiment, the system software can be structured as part of a network of servers running the databases with all invoice, sellers and customers for matching. In this embodiment, the server software will be multi-threaded and may be co-located in a number of geographic locations and accessed through the internet or non-internet based connections. The system software can also be used internally on private or corporate networks and/or computer systems.

The system is networked to allow sellers and customers with internet or network access from anywhere to easily and quickly upload their sales and purchase invoices or users within a single organization. Users of the system can connect to it remotely through secure network connections and connections to their input interfaces (both manual and application interfaces).

Software packages are also disclosed that include an executable code for intelligently determining an invoice chain comprising at least one sales invoice and at least one purchase invoice and offsetting the at least one purchase invoice with the at least one sales invoice.

Software Integration

Contemplated systems may integrate with a number of software solutions through an API and/or other conventional integration methods. One contemplated system can be built based on XML and/or the EDI (Electronic Data Interchange) framework and standards, which allows integration with the majority of electronic accounting and document exchange systems. Integration of these systems may include utilizing QuickBooks, Peachtree, SAP, Sage (Mas 90/Sage Mas 200, Accpac), Net Suite, Everest Software, Exact Financials, Oracle, Microsoft, Epicor and combinations thereof.

Communication

Figure 4:
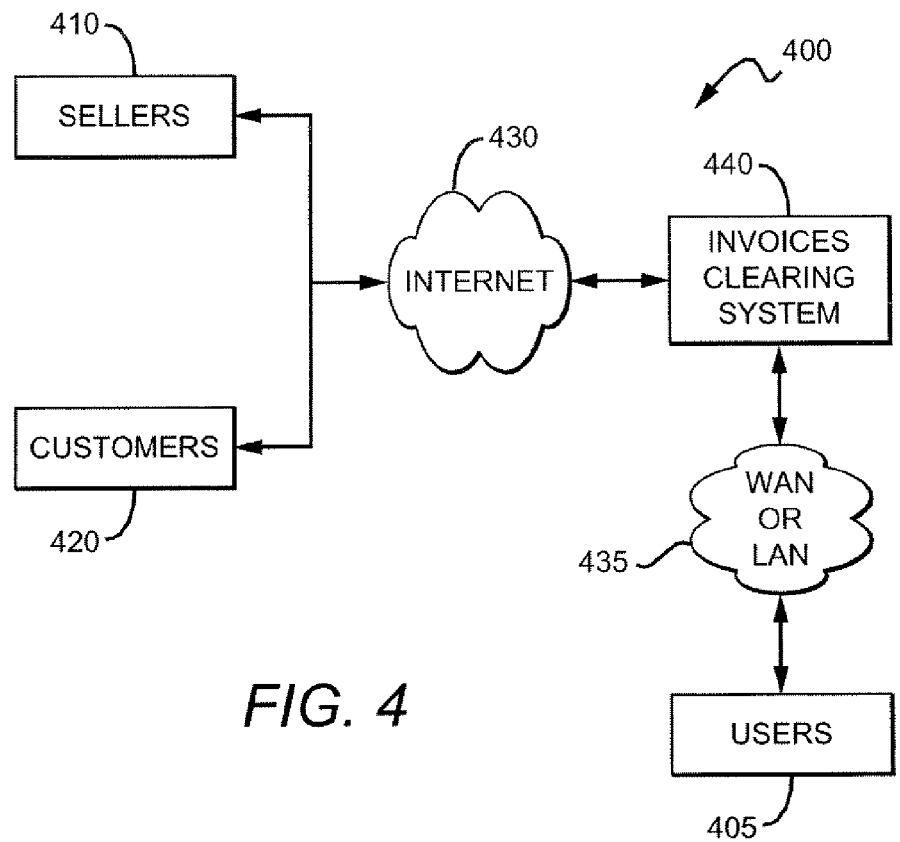
FIG. 4 shows a block diagram for a contemplated system, where a contemplated workflow of invoices in a computer-based network environment is described.

FIG. 4, shows some contemplated methods and systems 400 for users 405 (sellers 410 and customers 420) to connect and communicate with the invoice offsetting system. Specifically in FIG. 4, one contemplated embodiment includes the method where sellers 410 and customers 420 place invoices or invoice information (not shown) into an invoices clearing system 440 using Internet, WAN, LAN, FTP or other electronic communication methods 430 and 435; using integrated applications, including among others, accounting software, EDI implementations, XML or more. The submission of invoices or invoice information to the system may be done automatically or under special conditions initiated by an operator.

Users and their systems or applications can connect, integrate and communicate with the invoice offsetting system, including among others:

EDI VAN & Internet Connection

Contemplated systems may integrate its services with EDI VAN providers to allow users to connect through their existing or modified accounts. EDI connections can be provided through:

Value Added Networks

In the most basic form, a Valued Added Network or "VAN" acts as a regional post office. They receive transactions, examine the 'From' and the 'To' information, and route the transaction to the final recipient. VANs provide a number of additional services, e.g. retransmitting documents, providing third party audit information, acting as a gateway for different transmission methods, and handling telecommunications support. Because of these and other services VANs provide, businesses frequently use a VAN even when both trading partners are using Internet-based protocols. Healthcare clearinghouses perform many of the same functions as a VAN, but have additional legal restrictions that govern protected healthcare information.

VANs also provide an advantage with certificate replacement in AS2 transmissions. Because each node in a traditionally business-related AS2 transmission usually involves a security certificate, routing a large number of partners through a VAN can make certificate replacement much easier.

Internet/AS2

Until recently, Internet transmissions were handled by nonstandard methods between trading partners usually involving FTP or email attachments. There are also standards for embedding EDI documents into XML. Many organizations are migrating to this protocol to reduce costs. For example, Wal-Mart is now requiring its trading partners to switch to the AS2 protocol.

AS2 (Applicability Statement 2) is the draft specification standard by which vendor applications communicate EDI or other business-to-business data (such as XML) over the Internet using HTTP, a standard used by the World Wide Web. AS2 provides security for the transport payload through digital signatures and data encryption, and ensures reliable, non-repudiable delivery through the use of receipts

VPN

Users may wish to connect to contemplated systems via a Virtual Private Network (VPN) over the Internet, utilizing the IP Security Protocol (IPSec).

Web SSL

Contemplated systems may provide SSL encryption directly through the internet.

Cross-Connect

Contemplated systems may be hosted by other providers through hosted data centers.

Extranet

Contemplated systems may connect to several extranet providers, including BT-Radianz, TNSi, Yipes, and SAVVIS. These contemplated systems may connect to customers via any open and available extranet provider, based on subscriber demand and cooperation from the extranet provider.

Private Line

Some contemplated users may wish to initiate a private line (or point-to-point) connection to contemplated systems using leased lines or other network methods, such as Telco-provided T-1. T-3, Frame Relay, ATM and/or MetroE. These connections are terminated by a user-provided and owned router or switch in the contemplated system datacenter space.

EXAMPLES

Example 1

Simple Diagram of Invoice Offsetting System

One seller (seller A) issues a sales invoice for $1000 to a customer, who is also identified as seller B. Seller B has issued a different sales invoice for $1000 to its customer, who is in turn also a seller (seller C) who has issued a sales invoice for $1000 to a third customer—who, as it turns out, is seller A. The matching and offsetting can happen within seconds of posting all of these invoices in the system.

Contemplated systems are used to offset all of these sales invoices based on seller A's purchase invoice from seller C being offset by seller A's sales invoice to seller B, whose purchase invoice to seller A can be offset by its (seller B's) sales invoice to seller C, completing the offset of all invoices in the chain.

Example 2

Figure 2:
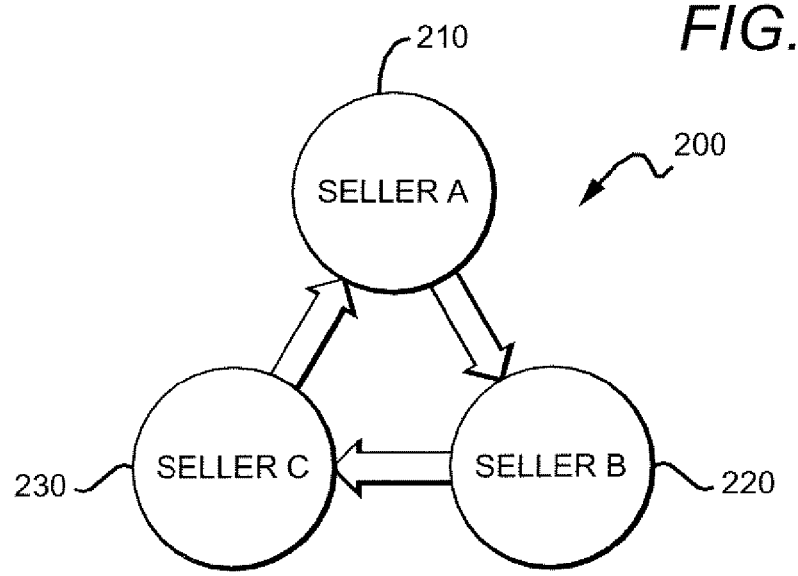
FIG. 2 shows a chain of invoices with linked credits and debits among multiple sellers (who are also customers) develops (which is described in detail in Example 2).

Simple Diagram of Invoice Offsetting System 200 with Uneven Invoice Amounts (FIG. 2)

Seller A 210 issues a $1000 sales invoice to a customer, who is also, considered a seller (seller B) 220. Seller B 220 has issued a $1000 sales invoice to a customer, who is also considered a seller (seller C) 230. Seller C 230 has issued a $500 sales invoice to yet another customer, who is identified by the system as seller A 210.

The invoice chain can be utilized to offset $500 for each of these invoices and a new balance of the remaining amounts of the sales invoices issued by seller A 210 and seller B 220 for $500 each, and also results in the offsetting of the full amount of the invoice between seller C 230 and seller A 210.

Example 3

Invoice Clearing System Example for Factoring Businesses

Contemplated systems and methods described herein also provide a faster cheaper and more efficient alternative to factoring, short term borrowing or financing of invoices.

For example, while the seller's factoring, issuing short-term borrowing instruments or financing invoices may cost around 2%, 0.8% and 0.7% on average per 30-day period respectively, the seller's cost in the novel system may range between 0.325% to 0.55%. This saving is achieved because in the novel system and methods matches, offsets and settles amounts of the seller's purchase invoices with amount from its sales invoices. So, as the seller would be required to pay an interest (in this example, 0.7% to 2%) on its sales invoices comparable to financing, receivable discount, or factoring, it would automatically receive a lower but proportional interest on its purchase invoices (in this example, 0.7% to 1.65%).

The novel system and methods provide a commercial medium for sellers to achieve their liquidity, buying power and reduced cost goals without the need for traditional financing, discounts or factoring methods and without their related costs. The amount of interest paid and received by the seller will depend on several factors which may include interest rate parity of an efficient financial market.

Example 4

Invoice Clearing System Example for Large Numbers of Sellers and/or Customers

An invoice chain may contain a large number of sellers and customers, invoices, amounts, currencies, varying invoice due dates and issuance dates. An optimum condition will include all sellers, customers, invoices, amounts, currencies and due and issue dates in the universe. In the contemplated methods an invoice can be part of one or more chains; an invoice amount may be cleared by one or more chains at the same or separate times; an invoice amount may be partially cleared; and an invoice may be part of one or more chain containing invoices of different terms, conditions, currencies and other variables common with invoices and methods of payment.

For example, a seller (Seller A) issues an invoice (sales invoice) to a customer, that customer in turn is also a seller (Seller B) who issues an invoice to another customer, who is also a seller (Seller C) who issues an invoice to Seller A. This forms a complete chain of invoices ("complete chain") wherein Seller A's sales invoice to Seller B can be linked to Seller B's sales invoice to Seller C and Seller C's sales invoice to Seller A, which is also Seller A's purchase invoice. Therefore, an amount of Seller A's purchase invoice with Seller C can be offset by Seller A's sales invoice to Seller B; an amount of Seller B's purchase invoice with Seller A can be offset by Seller B's sales invoice to Seller C; and an amount of Seller C's purchase invoice with Seller B can be offset by Seller C's sales invoice to Seller A. In other words Seller C owes Seller B who owes Seller A who owes Seller C, so by linking these three sellers in a network, Seller C can automatically deduct an amount that Seller A owes it from the amount Seller C owes to Seller B and in turn Seller B and Seller A can do the same and an amount of all their invoices can be settled and satisfied.

Example 5

Invoice Clearing System Example Showing Concept of Incomplete or Disparity Chains Many times and due to many factors, including among others, the number of sellers and or invoices in a network and their relationship to the total number of sellers and invoices in the world, or the times invoices are issued and certain conditions and variables of invoices, may cause a number of invoices in the system not to be offset through a complete invoice chain. The system will form links between sellers, their customers, their customers' customers and so on developing trees and branches of linked invoices. These linked invoices can be used by the system to form incomplete invoice chains "disparity chain".

For example, a seller (Seller A) issues an invoice (sales invoice) to a customer, that customer in turn is also a seller (Seller B) who issues an invoice to another customer, who is also a seller (Seller C) who issues an invoice to another customer (Seller D) and so on, but no one in this chain issues an invoice to Seller A. This is an incomplete invoice chain, unlike the complete chain where the debit value of a purchase invoice can be offset by the credit value of sales invoice; this offsetting condition can only exist with additional actions by the system.

Example 6

Invoice Clearing System Example Showing Resolution of Incomplete Invoice Chains

Invoices in incomplete or disparity chains can be offset through different methods within the system depending on determined optimal conditions. One contemplated method of offsetting and settling these invoices is to allow the last customer in a chain to use one or more sales invoices outside the chain. Another contemplated method may allow the last customer to use conventional methods of financing a purchase order issued to it. Another contemplated method may allow the last customer to use conventional methods of financing or making a payment and keeping the interest premium from the paid purchase invoice in the same chain. These contemplated method's results can provide the first seller in the disparity chain with either a payment on its sales invoice in the chain or the ability to offset one or more of its other purchase invoices outside the chain. All sellers who are also customers in the disparity chain will have their invoices offset, cleared and settled in a similar fashion to a complete invoice chain.

Figure 5:
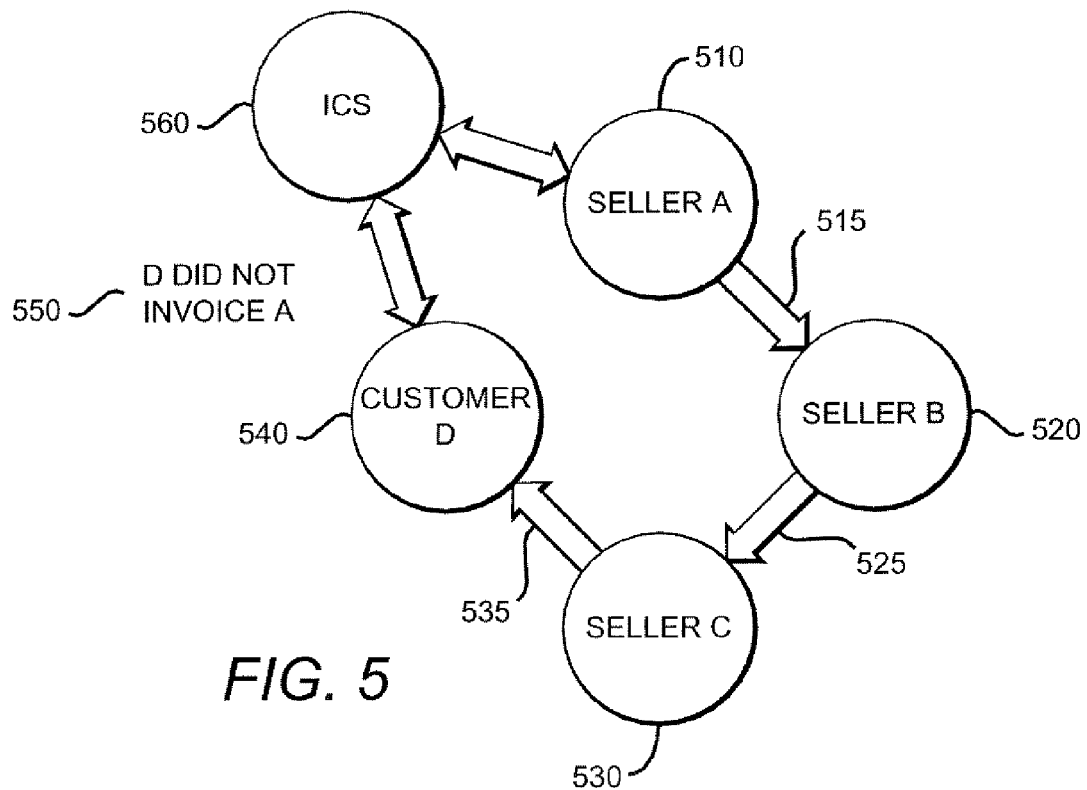
FIG. 5 shows an example of an incomplete invoice chain or a disparity chain.

For example as shown in FIG. 5, a seller (Seller A) 510 issues an invoice 515 (sales invoice) to a customer, that customer in turn is also a seller (Seller B) 520 who issues an invoice 525 to another customer, who is also a seller (Seller C) 530 who issues an invoice 535 to another customer (Customer D) 540, but no one in this chain issues an invoice 550 to Seller A. These invoices and invoice chain can be processed and intelligently optimized by utilizing a contemplated invoice clearing system 560. Customer D can use one or more sales invoices from outside this chain to offset its purchase invoice in the chain or one can factor the Seller A sales invoice and finance Customer D's purchase invoice at the same costs and creating similar conditions to a complete invoice chain. This contemplated method is among several methods in the system that provide significant solutions to optimizing the liquidity and value of the system even with the smallest number of sellers, allowing for a smaller percentage of sellers in a network to reach the critical mass of close to optimal economic benefits.

Example 7

Invoice Clearing System Example Showing Alternative Offsetting Method

Another contemplated method of method of offsetting and settling these invoices is to use the interest from the sales invoice of the first seller in the chain and the margin to be collected between what the other sellers in the chain pay and what they receive in interest or discounts, (if and when the invoices of the incomplete or disparity chain are offset), to provide a discount or interest to the last customer in the chain in order for the last customer in the chain to satisfy an amount of its purchase invoice in the chain. The last customer can choose to pay that amount and keep the interest or discount; or use the interest or discount to pay the interest on financing.

For example, a seller (Seller A) issues an invoice (sales invoice) to a customer, that customer in turn is also a seller (Seller B) who issues an invoice to another customer, who is also a seller (Seller C) who issues an invoice to another customer (Customer D), but no one in this chain issues an invoice to Seller A. One can use the amount of interest payable by the Seller A for the early payment of its sales invoice and the margin of difference between what sellers B and C pay on their own sales invoices and what they would receive on their purchase invoices if they're offset in the chain, to pay an amount of interest or discount to entice Customer D to pay or finance Customer D's purchase invoice in the chain.

Example 8

Invoice Clearing System Example Showing Optimization

The system automatically and/or through business rules determines and picks the optimal or close to optimal starting points of first seller and/or first invoice in forming chains. The system also automatically and/or through business rules determines and forms the optimal or close to optimal invoice chain for offsetting. In determining the optimal or close to optimal starting point or chain, the system depends on the determined optimal conditions. The system can also operate without optimization by picking first seller and/or first invoice and chains randomly or first come first served.

Although it may not become a factor in the future, dependency on current computer hardware computational powers at a certain point may limit the ability of the system to determine within a reasonable period the optimal starting point or optimal invoice chain to clear. In such a case, the system will instead determine the close to optimal point, such as a contemplated method of determining the optimal invoice chain by building chains starting with every sales invoice in the top 20% of sellers with the highest amounts of invoices and choosing to clear chains with the highest total invoice amounts cleared. Another contemplated method is to find the within 15% the top 20% of the most recurring invoice amounts in the system and start chains with every one of these invoices to find the chains with the highest amounts and most sellers to clear, regardless of whether it's a complete invoice chain or an incomplete chain.

Another contemplated method is to pick in random 20% of invoices submitted in a given day in the system as starting points and offset and clear all the chains built. Yet another contemplated method is to start an invoice chain with every new invoice submitted to the system and use its result for picking the close to optimal chain of the largest amount and secondarily the most invoices cleared. These and other contemplated methods depend on factors in the system such as the number of invoices and the number of sellers and customers to determine which is the best contemplated method for a computer to reach the closest optimal results within a reasonable time frame. For example, if there are 7 million invoices in the system, picking the optimal starting point is impractical on today's computers, picking the second contemplated method may result in up 80% of the desired results.

For example, one contemplated method of the system picks the optimal starting point based on the highest amount invoice in the network in order to maximize the amounts offset of invoices in a chain. This starting point will save considerable computing resources while achieving a certain level of liquidity and customer satisfaction. Another contemplated method picks the optimal starting point by identifying the top 20% of the invoices in the system with the most recurring invoice amount (within 10% margin of difference in the amounts) and building trees and branches of linked invoices from each of those top 20% of invoices to find the optimal or close to optimal chains to offset.

In another example, a complete chain of 100 invoices (Chain A) may offset and clear $700 per invoice or an average of 50% of the average invoice amount in the chain, but a chain of 77 invoices (Optimized Chain) including 70 of Chain A invoices may offset and clear $1,200 per invoice or an average of 80% of the average invoice amount in that chain. The system will disregard Chain A and offset invoices in the optimized chain that the system considers as closed to an optimal chain that Chain A.

Example 9

A Contemplated Method for Financial Institutions to Use Incomplete or Disparity Invoice Chain Seller A issues an invoice (sales invoice) to a customer, that customer in turn is also a seller (Seller B) who issues an invoice to another customer, who is also a seller (Seller C) who issues an invoice to another customer (Customer D), but no one in this chain issues an invoice to Seller A. The system can automatically or through user transaction approval, factor the Seller A's sales invoice and finance Customer D's purchase invoice at the same costs and create similar conditions to a complete chain; or deliver a portion of the interest margin as incentive to customer to pay early as explained in disparity chain example.

The Invoice Clearing System (ICS) may be used to automatically purchase sales invoice (Factor) from Seller A at a discount. In another embodiment, one may offer Customer D the ability to use other sales invoice(s) to satisfy the obligations of its purchase invoice to Seller C automatically or get a free short-term interest loan. These two options are contemplated methods used by ICS in completing a disparity chain and can allow a financial institution to factor an invoice at its traditional rate and have it paid within minutes or a day by its loan to the last customer (Customer D). The financial institution will benefit from a significant increase in business and reduction in transaction and sales costs. The remaining invoices in a chain are offset in the same fashion as a complete invoice chain. ($500 Purchase Invoice debit with $500 Sales Invoice credit)

Example 10

Example of Contemplated Offsetting of Invoices in an Invoice Chain

Table 1 shows an example of a complete invoice chain.

TABLE 1

Complete invoice chain
Example date

| Seller | Customer | Invoice Amount | Seller interest to pay | Seller Interest to receive | Seller "Interest Margin" or Cost | Interest Discount % | Cost APR | Remaining Balance | Due Date | Seller Credit Rating |
|---|---|---|---|---|---|---|---|---|---|---|
| COMPANY A | COMPANY B | $50,000 | $328.60 | $84.00 | $244.60 | 0.51% | 6.00% | $2,000 | Jan. 21, 2008 | F |
| COMPANY B | COMPANY C | $250,000 | $182.00 | $93.00 | $ 89.00 | 0.19% | 2.60% | $202,000 | Jan. 16, 2008 | A |
| COMPANY C | COMPANY D | $80,000 | $147.00 | $78.00 | $ 69.00 | 0.14% | 2.50% | $32,000 | Jan. 11, 2008 | A |
| COMPANY D | COMPANY E | $48,000 | $106.00 | $63.00 | $ 43.00 | 0.09% | 3.27% | $— | Dec. 31, 2007 | C |
| COMPANY E | COMPANY F | $132,000 | $106.00 | $30.00 | $ 76.00 | 0.16% | 5.78% | $84,000 | Dec. 31, 2007 | C |
| COMPANY F | COMPANY G | $115,000 | $255.60 | $30.00 | $225.60 | 0.47% | 5.72% | $67,000 | Jan. 20, 2008 | B |
| COMPANY G | COMPANY A | $50,000 | $196.00 | $90.00 | $106.00 | 0.22% | 2.88% | $2,000 | Jan. 18, 2008 | A |
| Offset Amount | | $48,000 | | | | 0.25% | 4.11% | | | |
| Total Invoice Offset | | $336,000 | | | | | | | | |

In this example, in this contemplated method of a complete chain, all the sellers are also customers in the same chain. An amount of $48,000 ("Offset Amount") is determined as the smallest amount invoice and the highest amount that can be cleared in all invoices in the chain. Many sellers will have left over balances that become new outstanding balance amounts of these invoices and be processed again in the system without changing any of their terms.

The Interest Margin is the interest payable by a seller minus its interest receivable as a customer from another seller. The amount of interest paid and received by the seller will depend on several factors including interest rate parity with alternative financing and savings options, which includes credit worthiness; the time value from the offsetting date to the due date, and more.

Table 2 shows an example of an incomplete or "disparity" invoice chain.

TABLE 2

Incomplete invoice chain
Example date Dec. 21, 2007

| Seller | Customer | Invoice Amount | Seller Interest to pay | Seller Interest to receive | Seller "Interest Margin" or Cost | Interest Discount % | Cost APR | Remaining Balance | Due Date | Seller Credit Qualifier Rating |
|---|---|---|---|---|---|---|---|---|---|---|
| COMPANY A | COMPANY B | $50,000 | $480.00 | | $328.60 | 1.00% | 11.77% | $2,000 | Jan. 21, 2008 | F |
| COMPANY B | COMPANY C | $250,000 | $182.00 | $93.00 | $ 89.00 | 0.19% | 2.60% | $202,000 | Jan. 16, 2008 | A |
| COMPANY C | COMPANY D | $80,000 | $147.00 | $78.00 | $ 69.00 | 0.14% | 2.50% | $32,000 | Jan. 11, 2008 | A |

TABLE 2-continued

Incomplete invoice chain
Example date Dec. 21, 2007

| Seller | Customer | Invoice Amount | Seller Interest to pay | Seller Interest to receive | Seller "Interest Margin" or Cost | Interest Discount % | Cost APR | Remaining Balance | Due Date | Seller Credit Qualifier Rating |
|---|---|---|---|---|---|---|---|---|---|---|
| COMPANY D | COMPANY E | $48,000 | $106.00 | $ 63.00 | $ 43.00 | 0.09% | 3.27% | $— | Dec. 31, 2007 | C |
| COMPANY E | COMPANY F | $132,000 | $106.00 | $ 30.00 | $ 76.00 | 0.16% | 5.78% | $84,000 | Dec. 31, 2007 | C |
| COMPANY F | COMPANY G | $115,000 | $255.60 | $ 30.00 | $225.60 | 0.47% | 5.72% | $67,000 | Jan. 20, 2008 | B |
| COMPANY G | | | | $480.00 | ($480.00) | | | | | A |
| Offset Amount | | $48,000 | | | | 0.34% | 5.27% | | | |
| Total invoice Offset | | $288,000 | | | | | | | | |

In this example, not all the sellers are customers in the same chain. COMPANY A is a seller but not a customer in the chain and COMPANY G is a customer but not a seller in the chain. An amount of $48,000 ("Offset Amount") is determined as the smallest amount invoice and the highest amount that can be cleared in all invoices in the chain (COMPANY A has a sales invoice but not a purchase invoice in the chain, while COMPANY G has a purchase invoice but not a sales invoice in the chain. The chain is cleared by incentivizing COMPANY G to pay COMPANY F $48,000 for a discount of $480 or 1%.

Example 10

One Example of a Contemplated Code & a Design Approach for an Invoice Clearing System The problem is being decomposed to a reversed "Traveling Salesman" problem (TSP). TSP attempts to find the shortest/least expensive route to visit each city along a route, where expense is defined by some factor/variable. In its basic form, a contemplated invoice clearing system does the reverse and attempts to find the most expensive route.
Core Stages
1) Prepare a list of invoices
2) Build a matrix/graph showing relationships between individual companies as represented by invoices
3) Construct trees of invoices, with the following variable options.
   a) Tree root
   b) Rules Filter
   Each tree is essentially a sub graph of the matrix at a point in time. The resulting trees have the final clearable amounts at the leaf nodes of each tree.
4) The most expensive leaf node/tree path is selected based on path expense. All invoices in the selected path are effectively flagged as invalid.
5) The process is repeated from stage 3, with the still valid invoices.
Below is pseudo code showing implementation details and selected slices of implemented Java code

```
Function void Run( )
    List inv = PrepareInvoiceList( );
    Graph grp = MakeInvoiceGraph(inv);
    List trees = GenerateTrees(grp);
EndFunction
//------------------------------------------
//Pseudo Code
Function List PrepareInvoiceList( )
    List rawInvoices = ReadDatabase;
    List invoices;
    forEach rawInvoice in rawInvoices
        Var invoice = Fingerprint(rawInvoice);
        AddToList(invoices, invoice);
    endforEach
    return invoices;
EndFunction
//Actual Code
    private static ArrayList getInvoiceList(ResultSet readInvoice)
    {
        // TODO Auto-generated method, stub
        Invoice i;
        ArrayList al = new ArrayList( );
        try
        {
            while(readInvoice.next( ))
            {
                i = new Invoice( );
                i.setPayor(readInvoice.getString(2));
                i.setPayee(readInvoice.getString(3));
                i.setInvoiceNumber(readInvoice.getString(4));
                i.setPayDate(readInvoice.getDate(5));
                i.setIssueDate(readInvoice.getDate(6));
                i.setUploadDate(readInvoice.getDate(7));
                i.setAmount(readInvoice.getLong(8));
                al.add(i);
            }
        } catch (SQLException e) {
            // TODO Auto-generated catch block
            e.printStackTrace( );
        }
        return al;
    }
//------------------------------------------
//Pseudo Code
Function Graph MakeInvoiceGraph(list invoices)
    Graph relations;
    forEach invoice in invoices
        Var payee = invoice.payee;
        if GraphContains(relations, payee)
        then
            AddToGraph(relations, invoice);
        else
            AddPayee(relations, payee);
            AddToGraph(relations, invoice);
        endif
    endforEach
    return relations;
EndFunction
//Actual Code
    private InvoiceGraph buildGraph(ArrayList invoiceList)
    {
        InvoiceGraph ig = new InvoiceGraph( );
        Iterator i = invoiceList.iterator( );
        GraphNode gn;
        String payee;
        String val;
```

```
            while(i.hasNext( ))
            {
                gn = new GraphNode((Invoice)i.next( ));
                payee = gn.getPayee( );
                //check if payee added to hinge
                if(!ig.contains(payee))//if not add to
hinge
                {
                    ig.addHingeNode(payee);
                }
                //add to leaf
                ig.addNode(gn);
            }
            return ig;
//-----------------------------------------
//Pseudo Code
Function List GenerateTrees(Graph relations)
    List subroutes;
    List rules;
    Var tree = GetTreeRoot(relations, rules);
    while root isNotEmpty
    do
        GetTree(relations, rules, tree);
        AddToList(subroutes, tree);
        root = GetTreeRoot(relations, rules);
    endwhile
    return subroutes;
EndFunction
//-----------------------------------------
//Pseudo Code
Function Var GetTreeRoot(Graph relations, List rules)
    forEach rule in rules
        ApplyRule(relations, rule);
    endforEach
    return relations.nextnode;
EndFunction
//-----------------------------------------
//Pseudo Code
Function void GetTree(Graph relations, List rules, Var
root)
    while root.payers isNotEmpty
    do
        forEach rule in rules
            ApplyRuleToPayee(relations, rule,
root.payee);
        endforEach
        Var nextnode = relations.nextnode;
        if nextnode isEmpty
        then
            return
        else
            AddToTree(root, nextnode);
            GetTree(relations, rules, nextnode);
        endif
    endwhile
EndFunction
//Actual Code
    private void buildSubTree(HingeNode hnode,
InvoiceTree it, InvoiceGraph ig)
    {
        GraphNode gn = null;
        HingeNode hn = null;
        while(!hnode.processed( ))
        {
    if(Integer.parseInt(ig.peekNextHighToLow(hnode).g
etAmount( )) <
        Integer.parseInt(it.getCurrent( ).getAsGraphNode( )
.getAmount( )))
                {
                    gn = ig.getNextHighToLow(hnode);
                    hn = ig.getHingeNode(gn.getPayer( ));
                    it.addNode(gn);
                    numprocessed++;
                    if(hn != null)
                    {
                        treedepth++;
                        if(maxtreedepth <= treedepth)
                        {
                            maxtreedepth = treedepth;
                        }
                        buildSubTree(hn, it, ig);
                        treedepth--;
                    }
                    it.reverse( );
                }
                else return;
            }
        }
```

Thus, specific embodiments and applications of methods, systems and software for offsetting invoice obligations have been disclosed. It should be apparent, however, to those skilled in the art that many more modifications besides those already described are possible without departing from the inventive concepts herein. The inventive subject matter, therefore, is not to be restricted except in the spirit of the disclosure herein. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A software package, comprising:
   an executable code stored on a non-transitory computer-readable medium, the executable code for:
      generating a disparity invoice chain,
      wherein the disparity invoice chain includes at least three parties associated with invoice transactions;
      wherein the at least three parties included in the disparity invoice chain comprise:
         a last customer associated with at least one purchase invoice having a debit value, wherein the last customer in the disparity invoice chain is not a seller in the disparity invoice chain; and
         a first seller associated with at least one sales invoice having a credit value, wherein the first seller is not a customer in the disparity invoice chain,
      intelligently determining an offset amount for the disparity invoice chain, the offset amount comprising the smallest amount invoice and the highest amount that can be cleared in all invoices in the disparity chain;
      clearing the disparity chain by incentivizing the last customer to pay the offset amount; and
      offsetting the debit value of the last customer and the credit value of the first seller by the offset amount,
   wherein the executable code is stored on a computer readable storage medium.

2. A computer-readable storage medium storing instructions to cause a computing device comprising a processor to perform a method for resolving invoice obligations, the method comprising:
   generating a disparity invoice chain, the disparity invoice chain comprising at least three parties associated with invoice transactions, wherein the at least three parties associated with invoice transaction comprise:
      a last customer associated with at least one purchase invoice having a debit value, wherein the last customer in the disparity invoice chain is not a seller in the disparity invoice chain; and a first seller associated with at least one sales invoice having a credit value, wherein the first seller is not a customer in the disparity invoice chain;

determining an offset amount for the disparity invoice chain, the offset amount comprising the smallest amount invoice and the highest amount that can be cleared in all invoices in the disparity chain;

clearing the disparity chain by incentivizing the last customer to pay the offset amount; and offsetting the debit value of the last customer and the credit value of the first seller by the offset amount.

* * * * *